United States Patent [19]

Coon

[11] 4,271,215
[45] Jun. 2, 1981

[54] METHOD FOR RELEASING FROZEN WATER

[75] Inventor: Delbert L. Coon, Midland, Mich.

[73] Assignee: Dow Corning Corporation, Midland, Mich.

[21] Appl. No.: 89,438

[22] Filed: Oct. 31, 1979

[51] Int. Cl.³ .............................................. B05D 3/02
[52] U.S. Cl. ........................................ 427/387; 106/2; 106/13; 427/388.1; 427/388.5; 427/389.7; 427/393.5; 427/421; 427/429; 427/435
[58] Field of Search ............... 106/13, 2; 260/29.1 SB; 428/447; 427/387, 388.1, 388.5, 389.7, 393.5, 421, 429, 435; 252/70

[56] References Cited

U.S. PATENT DOCUMENTS

| | | | |
|---|---|---|---|
| 3,047,528 | 7/1962 | Bluestein | 528/18 X |
| 3,227,579 | 1/1966 | Bluestein | 427/387 |
| 3,460,981 | 8/1969 | Keil et al. | 428/429 |
| 3,684,756 | 8/1972 | Brooks | 260/29.1 SB |
| 4,011,362 | 3/1977 | Stewart | 428/447 |
| 4,076,695 | 2/1978 | Keil | 260/46.5 R X |
| 4,101,686 | 7/1978 | Strella et al. | 427/22 |

*Primary Examiner*—Ronald H. Smith
*Assistant Examiner*—Thurman K. Page
*Attorney, Agent, or Firm*—George A. Grindahl

[57] ABSTRACT

A coating composition comprising a carboxy-functional siloxane fluid, an organic titanate and a volatile diluent is applied to a water-impermeable surface and dried. The treated surface has the properties of promoting water-droplet formation, rather than water-film formation when rained upon and releasing frozen water, such as ice, snow, sleet and frost under a very low force.

4 Claims, No Drawings

METHOD FOR RELEASING FROZEN WATER

BACKGROUND OF THE INVENTION

The present invention relates to a process for coating a water-impermeable surface with a silicone composition to facilitate the removal of frozen water therefrom.

The presence of frozen water, such as ice, snow, sleet and frost, on human-made structures, that are exposed to weather, such as buildings, ships, aircraft, trailers, automobiles, cables, antennae, bridges, wires, signs, storage tanks and traffic signals, is frequently undesirable and/or dangerous. Its prompt removal is often dictated by safety, structural and economic considerations. On the other hand the formation of frozen water onto a substrate is also deliberately caused by humans, such as in the formation of ice pieces, such as blocks, cakes and cylinders. Its removal from the substrate in these instances is necessitated by convenience and/or economic considerations.

U.S. Pat. No. 3,460,981, claims a method for treating certain surfaces with certain aminoalkyl siloxanes, or monocarboxylic acid salts thereof, to facilitate the release of ice therefrom. Although this method is very effective, better release of ice is desired in many instances.

Many of the carboxy-functional siloxane compositions that are used in the method of the present invention have been disclosed in a U.S. patent application, Ser. No. 5949, filed on Jan. 24, 1979 and assigned to the assignee of this invention.

Polyvalent metal salts of carboxy-functional siloxane compositions have been used to render permeable substrates water-repellent as disclosed in U.S. Pat. No. 3,227,579.

In U.S. Pat. No. 4,011,362 it is disclosed that certain carboxy-functional siloxane fluids, alone or in combination with a trimethylsiloxy endblocked polydimethylsiloxane fluid, can be applied to metal substrates to improve their release characteristics. It is particularly suggested that the invention has utility in treating metal fuser rolls in duplicating machines; and the release of nylon from a metal substrate is shown. A similar disclosure can be found in U.S. patent applications Ser. Nos. 491,432 and 491,415 filed on July 24, 1976, copies of said applications having been filed as priority documents with Dutch patent application No. 7506978.

In U.S. Pat. No. 4,076,695 it is disclosed that when certain carboxy-functional siloxane fluids are incorporated in a polyurethane composition used in a reaction injection molding process that better release of the molded part can be achieved.

In U.S. Pat. No. 3,047,528 it is disclosed that a composition comprising certain carboxy-functional siloxanes, certain fillers, and a polyvalent metal compound curing agent can be cured, by heating, into an elastomeric or rubbery product useful in forming gaskets, insulating electrical conductors, or encapsulating electrical components. Titanium is disclosed as one of seventeen suitable polyvalent metals, with tetrabutyl titanate being specifically disclosed.

SUMMARY OF THE INVENTION

It is an object of this invention to provide a method for treating a water-impermeable surface to improve the release of frozen water therefrom.

It is another object of this invention to provide a method for treating a water-impermeable surface so that ice pieces, rather than ice sheets, are formed thereon under freezing conditions.

These objects, and others, are obtained in the method of this invention wherein a water-impermeable surface is treated with a homogeneous mixture of a carboxy-functional siloxane fluid, a titanate and a volatile diluent. After being applied to the surface the mixture is dried.

DETAILED DESCRIPTION OF THE INVENTION

The present invention relates to a method for treating a water-impermeable surface to facilitate the release of frozen water therefrom, said method comprising applying to said water-impermeable surface a coating composition obtained by mixing components consisting essentially of (A) 15 to 70 parts by weight of a carboxy-functional siloxane fluid having the formula $R'(CH_3)_2SiO\{(CH_3)_2SiO\}_x\{(CH_3)RSiO\}_ySi(CH_3)_2R'$ wherein R denotes a carboxy-functional radical bonded to silicon by a silicon-carbon bond, R' denotes a methyl radical or an R radical, x has an average value of from 25 to 400 and y has an average value of from 0 to 25, there being an average of at least two carboxy-functional radicals per molecule of said siloxane fluid, (B) 0.1 to 5 parts by weight of a titanate having the formula $Ti(OR'')_4$ wherein each R'' is an aliphatic radical or a hydroxylated aliphatic radical having 1 to 12 carbon atoms and (C) 25 to 80 parts by weight of a volatile diluent, the total of (A)+(B)+(C) being 100 parts by weight, and thereafter drying the applied coating composition.

One of the components that is essential for preparing the above compositions is a carboxy-functional siloxane fluid of the general formula

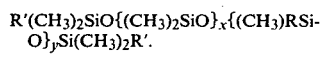

$R'(CH_3)_2SiO\{(CH_3)_2SiO\}_x\{(CH_3)RSiO\}_ySi(CH_3)_2R'$.

In its broadest meaning, R can be any monovalent radical containing a —COOH group and which is attached to the silicon atom by a silicon-to-carbon (Si—C) bond. So far as is known at this time, these two characteristics are the only essential ones for this invention. A preferred embodiment of R is a radical having the formula HOOC—Q— wherein Q is a divalent linking group attached to the silicon atom by an Si—C bond and is composed of carbon and hydrogen atoms, or carbon, hydrogen and sulfur atoms, there being from 2 to 10 carbon atoms in Q, and any sulfur atoms present are in the form of thioether linkages. Specific examples of R radicals include the $HOOCCH_2CH_2$—, $HOOCCH(CH_3)CH_2$—, $HOOC(CH_2)_6$, $HOOC(CH_2)_{18}$—, $HOOCCH_2SCH_2CH_2$—, $HOOCCH_2OCH_2CH_2$— and $HOOC—C_6H_4—S—C_6H_4$—.

The number of dimethylsiloxane units in the carboxy-functional siloxane is defined by x in the above formula and can range from 25 to 400, but preferably ranges from 75 to 125. In a like manner the number of $(CH_3)RSiO$ units is defined by y in the above formula and can range from 0 to 25, and preferably ranges from 0 to 10. The carboxy-functional fluid may be endblocked with trimethylsiloxane units (i.e. R' is a methyl radical) and/or carboxy-functional dimethylsiloxane units (i.e. R' is a carboxy-functional radical). Preferably the fluid is endblocked with trimethylsiloxane units and y ranges from 2 to 10. In any case there must be an average of at least two carboxy-functional radicals per molecule of the siloxane fluid. The carboxy-functional radicals may or may not all be identical; conveniently they are.

So far as is known at this time, the viscosity of the carboxy-functional siloxane is not critical and any such fluid siloxane can be employed. Obviously, the more viscous fluids can be more difficult to apply to a substrate, but this can be compensated for, to a large degree, by the amount of volatile diluent that is used.

Another component which is essential for preparing the compositions used in the method of this invention is a titanate having the general formula Ti(OR")$_4$. The R" radical can be any aliphatic hydrocarbon radical or any hydroxylated aliphatic hydrocarbon radical containing from 1 to 12 carbon atoms. Thus R" can be, for example, a methyl, ethyl, isopropyl, butyl, 2-ethylhexyl, decyl, dodecyl, octylene glycolyl, ethylene glycolyl or hexylene glycolyl radical. The R" groups can be the same or mixed. Tetraisopropyl titanate is preferred.

A final essential component for preparing the above-described coating compositions is a volatile diluent. By volatile it is meant that the diluent evaporates sufficiently rapidly, under the particular drying conditions that are used in the method of this invention, that a non-lumpy coating is obtained on the water-impermeable surface. By diluent it is meant a material that serves to disperse the carboxy-functional siloxane fluid in a homogeneous manner, such as in suspension, and preferably, in solution.

Specific examples of volatile diluents that are suitable for use in the method of this invention include benzene, toluene, xylene, naphtha mineral spirits, petroleum ethers, pentane, hexane, heptane, cyclohexane, perchloroethylene, trichloroethane and methylene chloride. Preferably the volatile diluent has little or no affinity for water.

Hexane is a particularly effective diluent to use when the composition is applied and dried at temperatures ranging from 10° to 30° C. When the coating composition is applied and/or dried under colder or warmer conditions, a more- or less-volatile diluent, respectively, may be desired. More than one volatile diluent may be used if desired.

The coating composition that is used in the method of this invention may contain non-essential components provided its premium release characteristics toward frozen water is not significantly decreased. Non-essential components encompass colorants, stabilizers, propellents and other adjuvants well-known in the coatings art.

For every 100 parts by weight of the essential components that are used to prepare the coating composition the volatile diluent accounts for from 25 to 80 parts, the siloxane fluid accounts for from 15 to 70 parts, and the titanate accounts for from 0.1 to 5 parts, preferably from 0.25 to 0.75 parts, by weight.

It should be remembered that, as a general rule, the gel time, and hence the pot life, of a curable siloxane composition whose curing reaction is catalyzed by a titanate catalyst is decreased as the concentration of titanate is increased. The proper amount of any particular titanate (B) that is mixed with any particular carboxy-functional siloxane fluid (A) can be determined by simple experimentation so as to avoid undesirable gelation in the coating composition.

So far as is known at this time, the best method for preparing the compositions that are used in the method of this invention is to first mix the titanate in a portion of the volatile diluent and the carboxy-functional siloxane in the balance of the volatile diluent and then mix the two solutions and any other ingredients. Other orders of mixing can be used but tend to cause the formation of undesirable gels before the coating composition can be applied to a substrate if they involve mixing undiluted titanate with undiluted carboxy-functional siloxane fluid.

The use of the above compositions in the process of this invention can be accomplished in a relatively simple and straightforward manner. The process involves applying the composition to the water-impermeable surface and then drying the applied composition. In this manner it is believed that the surface is altered in some manner, such as by the deposition of a film thereon, whereby the release of the frozen water therefrom is facilitated. The compositions can be applied to the surface by any manner convenient to the user such as by spraying, brushing, dipping, flooding or wiping the composition thereon. Likewise, drying can be accomplished in any convenient manner as by simple air-drying (e.g. standing), by blowing air or other dry gas over the surface, or by heating to speed up the drying process.

The amount of the coating composition that is applied to the surface is not critical except in so far as enough must be applied to achieve the degree of improved release of frozen water from the surface that is desired. Obviously there will be a maximum amount which can be applied beyond which no additional benefit can be seen and to use more would be wasteful.

The method of this invention is useful for treating any water-impermeable substrate, such as metallic, painted, rubber, glass, porcelain and plastic-coated surfaces; however, it is most useful for treating surfaces that are wetted by water and particularly metallic surfaces such as aluminum, copper and ferrous surfaces, such as iron, steel and stainless steel.

Now in order that those skilled in the art may better understand how the present invention can be practiced, the following examples are given by way of illustration and not by way of limitation.

EXAMPLE 1

An ice-releasing coating composition was prepared by mixing 0.15 grams of tetraisopropyl titanate with 40 grams of hexane and mixing with the resulting solution 20 grams of a carboxy-functional siloxane fluid having the formula

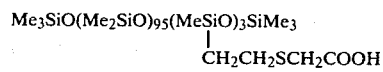

A stainless steel spatula was immersed into the coating composition, withdrawn and allowed to dry at room temperature.

Water droplets were placed on the thus-treated spatula and on an untreated stainless steel spatula and the droplet-bearing spatulas were placed in a freezer at −20° F. (−29° C.) to freeze the droplets of water. The frozen droplets were easily slid from the spatula that had been treated by the process of this invention but not from the untreated spatula.

EXAMPLE 2

An ice-releasing coating composition was prepared by mixing 112.5 grams of tetraisopropyl titanate with 3750 grams of hexane, to form a first solution, and mixing 7500 grams of the carboxy-functional siloxane fluid disclosed in Example 1 with 3750 grams of hexane to form a second solution and thereafter mixing the two solutions.

Four external, substantially vertically-mounted, painted, metal panels of a building were coated with the above coating composition using a roller applicator. Three of the panels were given a second coat, two of the panels were given a third coat and one panel was given a fourth coat of the coating composition, all coatings being air-dried before another coat was applied thereto.

Approximately three weeks after being coated the four panels experienced a snowstorm having both wet and dry snow. The panel that had been coated four times remained ice- and snow-free during the snowstorm, but experienced a slight accumulation of snow during another snowstorm 11 days later. The remaining three panels having lesser amounts of coating composition did not remain free of ice and/or snow.

EXAMPLE 3

Aluminum panels, 0.25 inches thick and approximately 6 inches long and 2.5 inches wide were scoured with cleanser and water until they were uniformly wetted with water and were then air-dried. One panel was rubbed with a paper towel saturated with the coating composition of Example 2. Another panel was rubbed with a paper towel saturated with the neat carboxy-functional siloxane fluid described in Example 1. Another panel was rubbed with a paper towel saturated with a prior art ice-releasing composition obtained by mixing 20.8 parts of isopropyl alcohol, 20 parts of hydroxyl-endblocked polydimethylsiloxane having a viscosity in the range of 35 to 50 centistokes at 25° C., 1.6 parts of $(CH_3O)_2CH_3Si(CH_2)_3NH(CH_2)_2NH_2$ and 1.2 parts of acetic acid.

After being air dried the three treated panels were immobilized in a cold box at $-13°$ C. and a 0.25 inch thick circular stainless steel washer having an attached wire lanyard and a circular hole of 1 square inch area was placed on the treated surface of each panel. When the panels and washers were thoroughly chilled water was poured into each cylinder defined by the washer and the treated panel. After the water had froze the force necessary to pull the ice cylinder from the treated panels was measured by leading the wire lanyard in a direction parallel to the surface of the panel, through a small hole in the wall of the cold box to a spring balance located outside of the cold box and pulling on the spring balance. Release force was measured in grams and was converted to newtons for this disclosure by multiplying by 0.009806650 and rounding off.

The panel that had been treated by the process of this invention released ice under a force of $300\pm100$ grams ($2.9\pm1.0$ newtons). The panel that had been treated with the neat (i.e. solvent-free and titanate-free) carboxy-functional siloxane fluid release ice under a force of 900 grams (8.8 newtons). The panel that had been treated with the prior art ice-releasing composition released ice under a force of about 750 grams (7.4 newtons). A clean untreated panel releases ice under a force of approximately 115 pounds (513 newtons). The superior ice-releasing behavior of an aluminum surface that has been treated by the method of this invention is evident, being more than 2.5 times better than the prior art performance.

That which is claimed is:

1. A method for treating a water-impermeable surface to facilitate the release of frozen water therefrom, said method comprising applying to said water-impermeable surface a coating composition obtained by mixing components consisting essentially of
  (A) 15 to 70 parts by weight of a carboxy-functional siloxane fluid having the formula $R'(CH_3)_2SiO\{(CH_3)_2SiO\}_x\{(CH_3)RSiO\}_ySi(CH_3)_2R'$ wherein R denotes a carboxy-functional radical bonded to silicon by a silicon-carbon bond, R' denotes a methyl radical or an R radical, x has an average value of from 25 to 400 and y has an average value of from 0 to 25, there being an average of at least two carboxy-functional radicals per molecule of said siloxane fluid,
  (B) 0.1 to 5 parts by weight of a titanate having the formula $Ti(OR'')_4$ wherein each R'' is an aliphatic radical or a hydroxylated aliphatic radical having 1 to 12 carbon atoms and
  (C) 25 to 80 parts by weight of a volatile diluent, the total of (A)+(B)+(C) being 100 parts by weight and thereafter drying the applied coating composition.

2. A process as defined in claim 1 wherein the concentration of (B) is from 0.25 to 0.75 parts by weight.

3. A process as defined in claim 2 wherein
  (A) is $(CH_3)_3SiO\{(CH_3)_2SiO\}_{95}\{(CH_3)(HOOCCH_2SCH_2CH_2)\text{-}SiO\}_3Si(CH_3)_3$
  (B) is tetraisopropyl titanate and
  (C) is hexane.

4. A process as defined in claims 1, 2 or 3 wherein the water-impermeable surface is a metallic surface or a painted metallic surface.

* * * * *